A. H. & J. S. YOUNG.
SAND DISTRIBUTING DEVICE.
APPLICATION FILED APR. 21, 1916.
1,234,436.
Patented July 24, 1917.
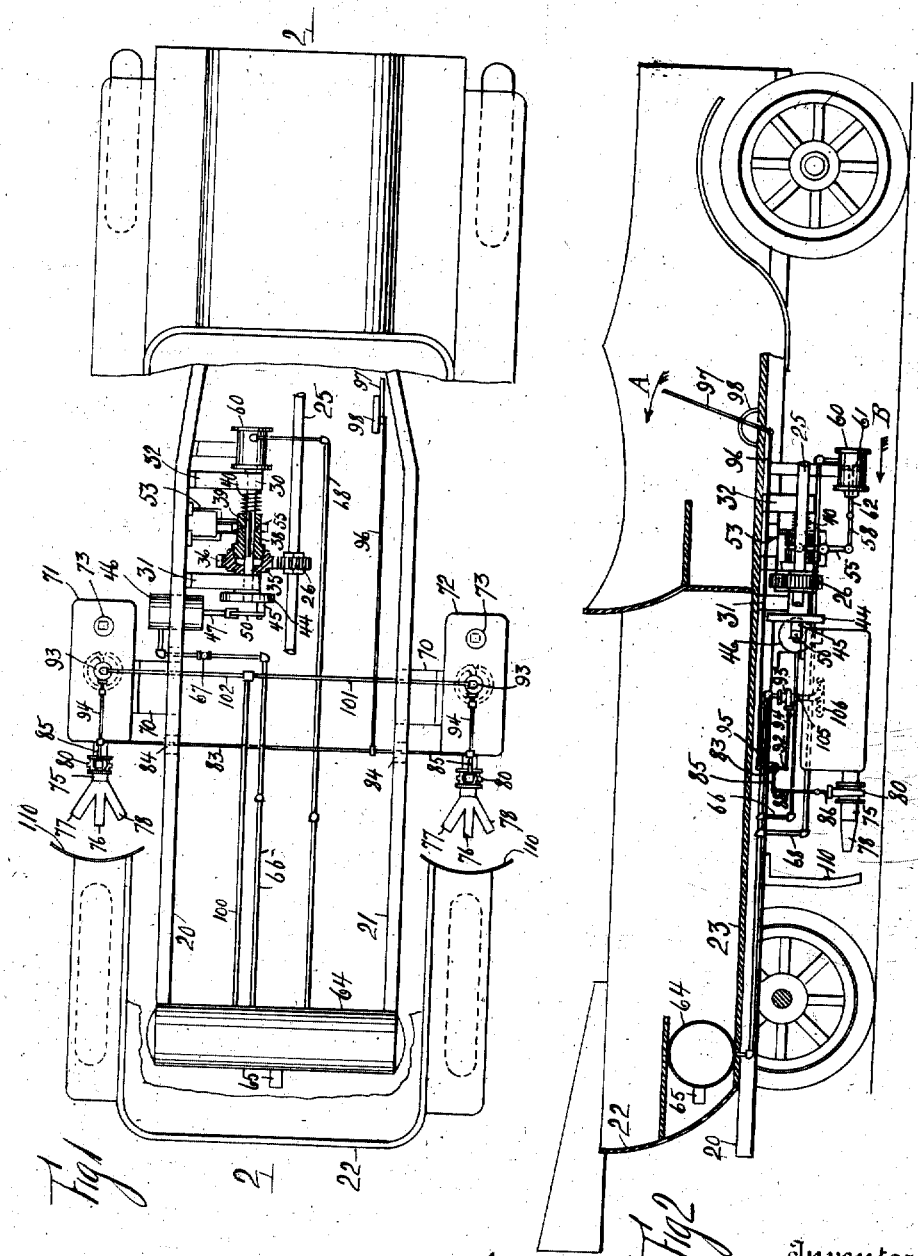
Inventors
August H. Young and James S. Young
By their Attorney
A. A de Bonneville

UNITED STATES PATENT OFFICE.

AUGUST H. YOUNG AND JAMES S. YOUNG, OF JERSEY CITY, NEW JERSEY.

SAND-DISTRIBUTING DEVICE.

1,234,436.

Specification of Letters Patent. Patented July 24, 1917.

Application filed April 21, 1916. Serial No. 92,610.

*To all whom it may concern:*

Be it known that we, AUGUST H. YOUNG and JAMES S. YOUNG, citizens of the United States, and residents of Jersey City, in the county of Hudson and State of New Jersey, have invented certain new and useful Improvements in Sand-Distributing Devices, of which the following is a specification.

This invention relates to a sand distributing device for automobiles or the like to prevent skidding. The organization of the invention comprises essentially a set of sand boxes having a series of spouts extending therefrom. The sand is ejected from the spouts by compressed air and strikes a concave shield which distributes the sand over a wide area in front of the rear wheels of the vehicle. The compressed air and the sand ejecting means are under control of the operator of the vehicle, at his seat.

In the accompanying drawings Figure 1 represents a top plan view of the invention connected to an automobile; and Fig. 2 shows an elevation of Fig. 1 and partial section as on the line 2, 2 of Fig. 1.

The automobile is represented with the members 20, 21 of its frame which support the body 22, with the floor 23. The main driving shaft of the automobile is indicated at 25, and has connected thereto the split pinion 26. A clutch shaft 30 is journaled in the journal brackets 31 and 32, which are fastened to the member 20 of the frame of the vehicle. The female member 35 of a friction clutch is journaled on the shaft 30 and has the teeth 36 on the periphery thereof. The male member 38 of the friction clutch is supported on the shaft 30 and is slidable on a spline 39 of the said shaft. A spring 40 encircles the shaft 30 and bears between the outer end face of the member 38 and the accompanying face of the bracket 32. A disk 44 is fastened to the shaft 30 and carries a pin 45. An air compressor 46 is supported from the member 20, and the piston rod 47 of the compressor is pinned to one end of the connecting rod 50. The other end of the said connecting rod 50 is supported on the pin 45. A bracket 53 extends from the member 20 and has pinned thereto the bell crank 55. The upper end of the latter is pinned to the male member 38 of the clutch, and the lower end of the bell crank 55 is pinned to one end of the connecting rod 58. A controlling cylinder is indicated at 60. It contains a piston 61 from which extends the piston rod 62. The latter is pinned to the adjacent end of the connecting rod 58. An air reservoir 64 with a safety valve 65 is located in the rear portion of the vehicle. Piping 66 with the check valve 67 connects the compressor 46 and the reservoir 65. Piping 68 connects the controlling cylinder 60 and the said reservoir. Brackets 70 extend from the members 20 and 21 of the frame of the vehicle and support the similar sand boxes 71 and 72. Removable screw plugs 73 are provided for each of said sand boxes. Each sand box has provided therefor a sand outlet nozzle 75 with three spouts 76, 77 and 78. A sand outlet valve 80 is interposed between each nozzle 75 and its accompanying sand box. A cross-shaft 83 is journaled in journal boxes 84 extending from the members 20 and 21. The shaft 83 has extending therefrom the normally horizontal arms 85, and the latter are connected to the valve spindles 86 of the valves 80 by means of the links 88. Normally vertical arms 92 extend from the cross-shaft 83. Air inlet valves 93 are provided for the sand boxes 71 and 72. Links 94 connect the spindles of the latter valves and the arms 92. A normally vertical arm 95 extends from the cross-shaft 83 and has connected thereto one end of the reach rod 96. The other end of the rod 96 is pinned to the sector arm 97, which can be pinned in different positions of the sector 98. Piping 100 extends from the reservoir 65 and branch piping 101, and 102 connects the pipe 100 and the air inlet valves 93. Piping 105 extends from each of the valves 93 and leads into the sand boxes 71 and 72. A perforated coil 106 in each sand box is connected to the piping 105. Concaved shields 110 extend from each side of the running board (not shown) and project to a little below the spouts 77 to 78.

To operate the invention the operator moves the sector arm 97 in the direction of the arrow A, by which the valve spindles 86 of the valves 80 and the spindles of the valves 93 are moved to open said valves simultaneously. The opening of the valves 80 enables the discharge of the sand from the sand boxes 71 and 72. The sand is forced out of the sand boxes by reason of the air pressure exerted upon the top of the sand by the opening of the valves 93. The air is discharged into the sand boxes through the perforations of the coils 106.

To maintain the requisite pressure in the reservoir 65, the air compressor is driven by the rotations of the shaft 25 through the pinion 26 and the friction clutch having the members 35 and 38. The members are normally locked together by means of the spring 40. When the pressure in the reservoir rises above the requisite pressure, the said pressure forces the piston 61 in the controlling cylinder 60 in the direction of the arrow B, and through the intervention of the bell crank 55 and its connections with the piston 61, the members of the clutch are disengaged from each other and the female member 35 of the friction clutch turns on the shaft 30.

The spouts 77 to 78 with the coaction of the shield 110 distribute the sand on a wide area on the surface of the ground in front of the rear wheels of the vehicle, which prevents the wheels skidding.

Having described our invention what we desire to secure by Letters Patent and claim is:

1. In an apparatus of the character described the combination, of a sand box, an outlet nozzle for the sand box, means to force air under pressure into said box to discharge sand or the like therefrom and a shield in front of the nozzle.

2. In a vehicle of the character described the combination, of a main driving shaft, an air compressor, for the vehicle, an air reservoir to store compressed air produced by said compressor, driving mechanism for said compressor controlled by the pressure of the air in said reservoir, a sand box for the vehicle, an outlet valve for sand for said sand box an inlet valve for compressed air for said box and means to operate said valves simultaneously.

3. In an apparatus of the character described the combination of a pair of sand boxes, an outlet nozzle with three spouts for each sand box, an outlet valve for each nozzle, a concaved shield opposite each set of spouts, an air inlet valve for each sand box, an air reservoir for the apparatus, piping between the reservoir and each air inlet valve and means to operate all the valves simultaneously, and with the opening of the valves forcing compressed air into the sand boxes and discharging sand or the like therefrom on the path of the wheels of said vehicle.

4. In an apparatus of the character described the combination of a pair of sand boxes, a perforated coil in each sand box, an outlet nozzle for each sand box, a shield opposite each nozzle, an air inlet valve for each sand box, means to conduct compressed air to each inlet valve and thence through the perforated coil coacting therewith and means to operate the valves simultaneously.

Signed at Jersey City in the county of Hudson and State of New Jersey this 15th day of April A. D. 1916.

AUGUST H. YOUNG.
JAMES S. YOUNG.

Witnesses:
JOHN V. BRIDGE,
J. E. GARIS.